Aug. 6, 1963        J. W. BURTON ETAL        3,099,946
                     PANORAMIC CAMERA
Filed July 29, 1960                          2 Sheets-Sheet 1

INVENTORS
JOHN W. BURTON
DONALD A. HOYT

ATTORNEY

Aug. 6, 1963  J. W. BURTON ETAL  3,099,946
PANORAMIC CAMERA
Filed July 29, 1960  2 Sheets-Sheet 2

INVENTORS
JOHN W. BURTON
DONALD A. HOYT
BY
ATTORNEY

United States Patent Office 3,099,946
Patented Aug. 6, 1963

3,099,946
PANORAMIC CAMERA
John W. Burton, Torrance, Calif., and Donald A. Hoyt, Willow Grove, Pa., assignors to the United States of America as represented by the Secretary of the Navy
Filed July 29, 1960, Ser. No. 46,321
6 Claims. (Cl. 95—16)
(Granted under Title 35, U.S. Code (1952), sec. 266)

The invention described herein may be manufactured and used by or for the Government of the United States of America for governmental purposes without the payment of any royalties thereon or therefor.

The present invention relates to a panoramic camera and more particularly to a panoramic camera characterized for automatically transporting a metered quantity of film and exposing the film to the image formed by a scanning objective lens system.

In aerial reconnaissance and surveying operations, the panoramic camera is used in taking photographs of ground terrain from an airplane. While the aircraft flies a level and straight course, the panoramic camera mounted therein will scan a field of view having a panoramic span determined by the angular limits of the objective axis in both directions from nadir. The scanning event obviously must be periodically repeated at a frequency sufficient to insure a slight overlap of panoramic exposures when they are placed side by side. At low-altitude or high-speed reconnaissance flights, a film scanning and transporting cycle must be maintained at a high frequency or speed in order to insure the overlap and thereby obtain a continuous photographic survey of the ground area traversed by the airplane.

Heretofore known automatic panoramic cameras are incapable of these high scanning frequencies or they may involve expensive and complex mechanical and electrical apparatus. Previous efforts to produce an inexpensive, high-speed automatic panoramic camera have met with several serious drawbacks. One such drawback has been the high mass inertia of the moving parts during the scanning event where changing velocities introduce undesirable and often intolerable acceleration forces and also cause the exposure time of the film to vary beyond the limits permissible without image motion compensation. Another drawback has been that such attempts have been accompanied by a considerable sacrifice in image acuity throughout the exposure area of the film. At the present high altitudes of reconnaissance flights, a high degree of acuity is essential.

Accordingly, it is an object of the present invention to provide a high-speed panoramic camera with which a metered quantity of film is automatically transported through the camera and which automatically scans a field of view and exposes the film to an image thereof, which cyclically repeats the transporting and scanning events at a rapid speed to insure a continuous photographic survey of a field of view which is moving in a direction normal to the scanned strip at a high speed, which obtains a high degree of acuity of the image on the film over the exposed frame area, and which obtains a minimum of stress on its components due to the forces caused by mass inertial effects.

It is another object of the present invention to provide an improved panoramic camera which transports the film therethrough as the objective lens system is repositioned for another scanning event, with which the transporting and scanning events are automatically cycled, and which maintains the exposure area of the film precisely fixed about the optical axis and in the focal plane of the objective lens system.

A still further object of the present invention is to provide a relatively simple and inexpensive high-speed automatic panoramic camera capable of wide application and utility in military reconnaissance, geological and meteorological surveys.

Various other objects and advantages will appear from the following description of one embodiment of the invention, and the most novel features will be particularly pointed out hereinafter in connection with the appended claims.

Figure 1:
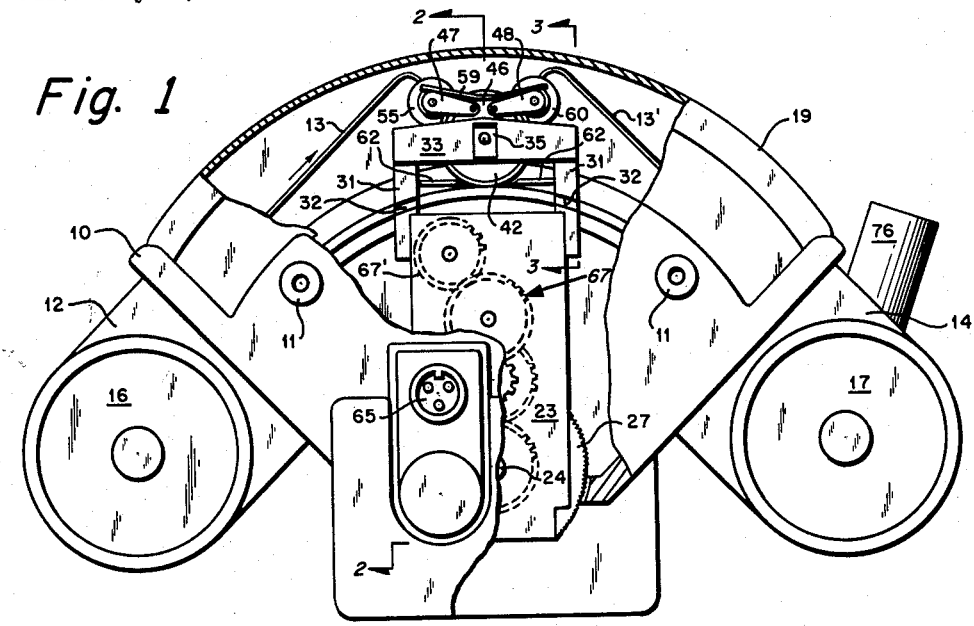
FIG. 1 represents a broadside view of a panoramic camera of the present invention with a part of its housing cut away.

In the illustrated embodiment of the invention, the panoramic camera has as its primary structural member a housing 10 having parallel walls of equal and coinciding sector configurations. The exposed surface of at least one of the parallel walls includes a pair of bosses 11 which are internally threaded to be engaged with corresponding threaded studs fixed to rigid airplane structure or other mounting means not shown in the drawing. The parallel walls are spaced apart and enclosed at the sector sides by two angularly-displaced walls. One of the latter walls includes a supply magazine 12 for holding large quantities of unexposed photosensitive strip film 13 on a supply reel not shown. The other of the angularly-displaced walls includes a receiving magazine 14 for holding equally large quantities of exposed film 13' on a take-up reel, also not shown. The magazines 12 and 14 also provide axial support to the supply and take-up reels, respectively, in order that the reels can freely rotate during film transporting. Access to the magazines 12 and 14 is obtained by removing screw-on covers 16 and 17, respectively. The arcuate edges of the parallel walls include continuous grooves 18 and 18' which are formed to receive a removable arcuately-shaped hood 19. The hood 19 is tightly seated in the grooves 18 and 18' against light passage and is manually secured by snap-on type clamps 21.

An adjustable objective lens system 22 is threadably fixed within an elongated, open-ended lens box 23 which, in turn, is disposed within the housing 10 and is pivotally connected to the housing 10 along the longitudinal axis of the lens box 23 by a pair of coaxial journals 24 and 25. The journal axes are normal to the plane surfaces of the parallel walls of the housing 10, bisect the sector angle, and are near the apex of the sector. The angularly-disposed walls of the housing 10 are disposed at such an angle as to provide sufficient rotation of the lens box 23 about the journals 24 and 25 for a desired scanning angle of the objective lens system 22, and are spaced apart at the apex formed thereby so that the lens system 22 has an unobstructed view throughout the scanning angle. A serrated mask 27 is fixed to the lens box 23 near the housing 10 apex and forms circular segments with a common center at journals 24 and 25. The clearance between the circumference of the segments of the mask 27 and the housing 10 is such that light passage into the camera housing 10 is substantially blocked irrespective of the angular position of the lens box 23 with respect to the housing 10.

A pair of parallel, oppositely disposed arcuate guide rails 28 and 29, circumscribed about the pivotal axis of the lens box 23, extend inwardly from the periphery of the respective parallel walls of the housing 10.

Figure 2:
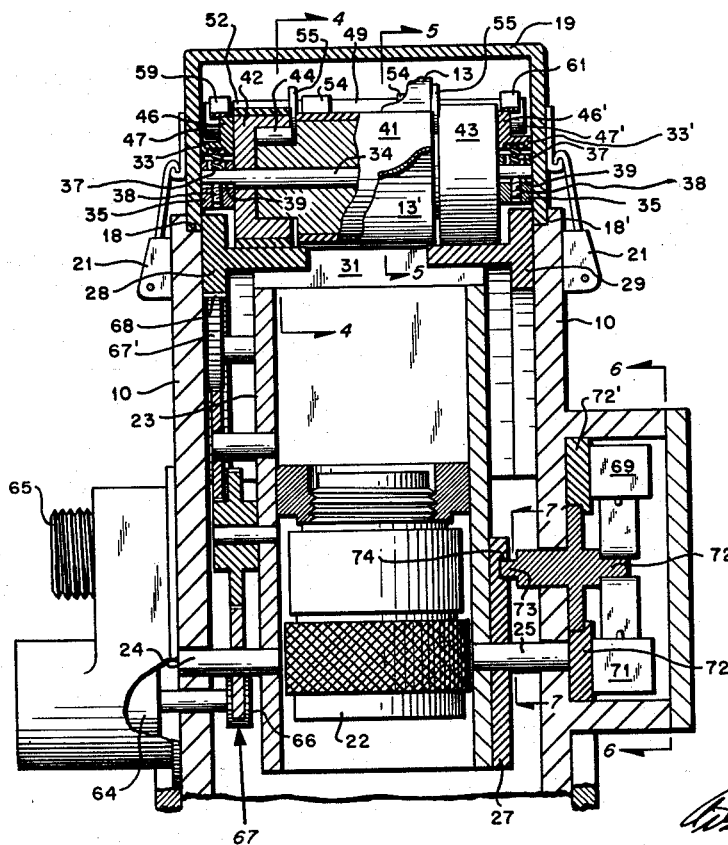
FIG. 2 represents a larger cross-sectional view of the panoramic camera taken along the line 2—2 of FIG. 1.
Figure 3:
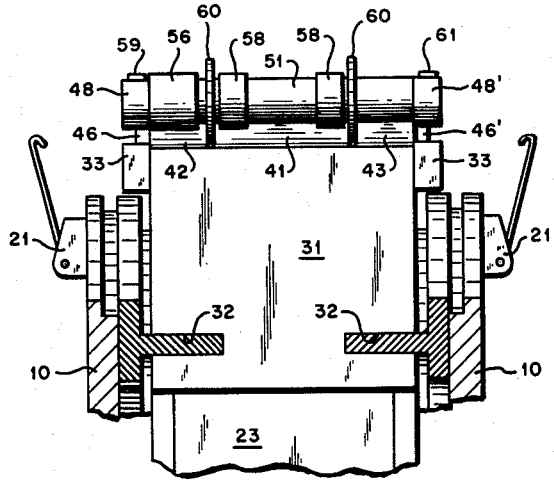
FIG. 3 represents a larger view of the film drive assembly of the panoramic camera taken along the line 3—3 of FIG. 1 with the film removed.
Figure 7:
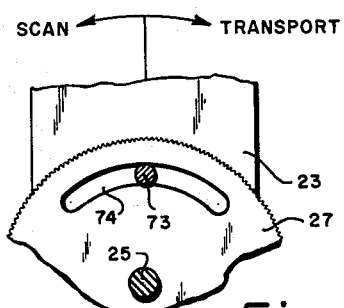
FIG. 7 represents a fragmentary view of the panoramic camera taken along the line 7—7 of FIG. 2 showing the lost motion mechanism which actuates the reversing switch mechanism illustrated in FIG. 5.
Figure 5:
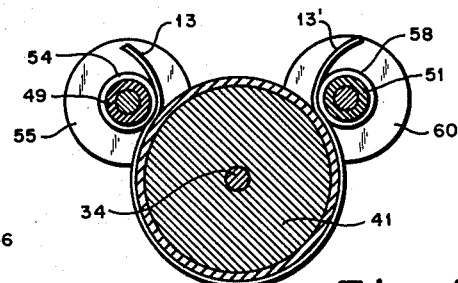
FIG. 5 represents a larger view of the film drum and pad rollers of the film drive assembly taken along the line 5—5 of FIG. 2.
Figure 4:
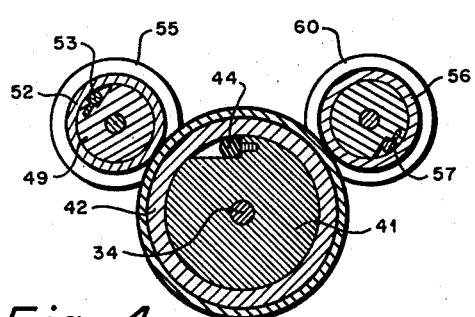
FIG. 4 represents a larger cross-sectional view of the film drum and pad rollers of the film drive assembly taken along the line 4—4 of FIG. 2.

A film drive assembly is secured to the outer end of the pivoted lens box 23 by a pair of upright members 31 having recesses 32 for maintaining the members 31 slidably engaged between the guide rails 28 and 29. A pair of parallel cross-beams 33 and 33' are fixed to the members 31 at the ends thereof adjacent to the guide rails 28 and 29, respectively, and support an axle 34 at the ends thereof. The ends of the axle 34 are urged toward the pivotal axis of the lens box 23 by springs 37 compressed between slidable bushings 35 and the cross-beams 33 and 33'. The axle 34 is prevented from rotating by bushing set-screws 38 fastened against flat surfaces 39 of the axle 34. A film drum 41, mounted on the axle 34 for independent rotation thereon, is disposed between two coaxial guide rail rollers 42 and 43 which are also independently rotatable on the axle 34. The drum 41 and the rollers 42 and 43 are preferably covered about their circumference with a rubber or similarly resilient composition. Such a material insures against slippage of the rollers 42 and 43 when they roll over the guide rails 28 and 29, respectively, and of the film 13 as it passes over the drum 41. As best seen in FIGS. 2, 4 and 5, the film drum 41 is connected to the roller 42 through a spring-biased roller clutch 44 whereby the roller 42 can drive the film drum 41 in one direction (counterclockwise as shown in FIG. 4), but the film drum 41 cannot drive the roller 42 in the same direction.

It should now be apparent that the rollers 42 and 43 roll over the outer surface of the guide rails 28 and 29, respectively, as the lens box 23 and the film drive assembly fixed thereto are pivoted about the journals 24 and 25. When the lens box 23 is rotated in a direction from the supply magazine 12 side of the housing 10 toward the receiver magazine 14 side of the housing 10, the roller 42 will rotate clockwise and cannot drive the film drum 41. Rotation of the lens box 23 in the opposite direction rotates the roller 42 counterclockwise and drives the film drum 41 therewith through the clutch 44.

The crossbeams 33 and 33' include appendages 46 and 46', respectively, each of which pivotally support a pair of equal and oppositely extending arms 47, 48 and 47', 48', respectively. The pair of arms 47, 48 pivot in a plane parallel to and spaced apart from the pair of arms 47' and 48'. The arm 47 rotates about the same axis as the arm 47', and rotatably supports a pad idler 49. Similarly, the arm 48 rotates about the same axis as the arm 48' and rotatably supports a pad idler 51. A clutch ring 52 fixed to the arm 47 and a clutch 53 permit the idler 49 to rotate only in one direction (clockwise as shown in FIG. 4). Idler pads 54 on the roller 49 prevent the film 13 from slipping and rings 55 guide the film 13 through the film drive assembly. Similarly, a fixed clutch ring 56 and a clutch 57 permit rotation of the idler 51 only in the one direction. Idler pads 58 prevent film slippage and rings 60 guide the film 13'. Leaf springs 59 and 61, fixed to the appendages 46 and 46', and biased against the outer ends of the arm 47, 48 and 47', 48', respectively, urge the idlers 49 and 51 toward the film drum 41.

The manner in which the film is threaded through the idlers 49 and 51 and the film drum 41 is shown in FIG. 5. The film 13 is exposed in the focal plane of the objective lens system 22 over a small arcuate area as defined by masking elements 62. It is contemplated that the elements 62 can be adjusted to vary the slit or aperture opening as required. It is further contemplated that the objective lens system 22 can be positioned so that the optical nodal point is at the pivotal axis of the lens box 23 if a definite correlation between image size and object size is to be maintained for measurement purposes. The latter, however, may not be essential for ordinary military or reconnaissance purposes.

The lens box 23 is oscillated about the journals 24 and 25 through the sector, as defined in the housing 10, by a housing-mounted electric motor 64 which is energized through an external electrical supply through a connector 65, also fixed to the housing 10. A driving gear 66, fixed to and rotatable with the output shaft of the motor 64, is connected through a train of spur gears indicated generally by the numeral 67. A spur gear 67' is connected to an internal gear sector 68 on the radially inward surface of the guide rail 28. All of the gears in the train 67 are journaled to the lens box 23, hence, rotation of the motor 64 in either direction will impart a force through the gear train 67 to the lens box 23 to pivot or oscillate the latter about the journals 24 and 25.

The motor 64 is of the direct current reversing type having its direction of rotation determined by the polarity of the applied voltage. The polarity of the motor 64 is alternated by a pair of snap-acting switches 69 and 71. The switches 69 and 71 are mechanically actuated by a "lost-motion" mechanism having a sliding element 72 which is restricted to rectilinear motion by guide bars 72', as shown by the two-pointed arrow in FIG. 6. A stud 73 on the sliding element 72 protrudes into an arcuate slot 74 in the serrated mask 27. The angle defined by the arcuate length of the slot 74 is slightly smaller than the angle through which the lens box 23 pivots in order that, at the opposite extremes of pivoting or oscillation, the stud 73 engages the end of the slot 74 and causes a rectilinear movement of the sliding element 72. The movement is sufficient to actuate the switches 69 and 71 and cause reversal of the motor 64.

Figure 6:
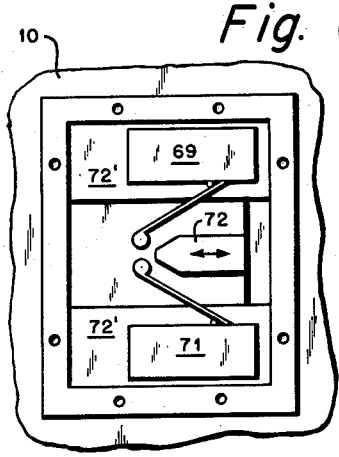
FIG. 6 represents an enlarged view of the panoramic camera motor reversing mechanism taken along the line 6—6 of FIG. 2.
Figure 8:
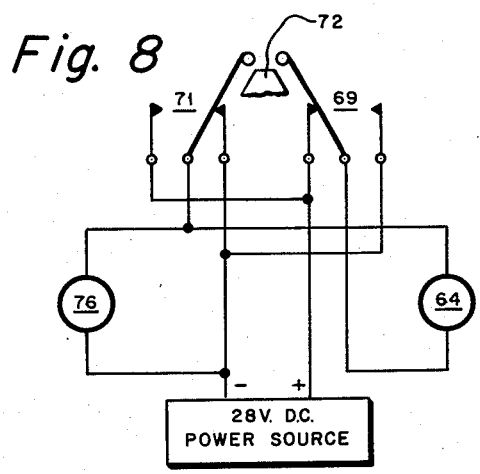
FIG. 8 is a schematic wiring diagram of the electrical circuit interconnecting the reversing switch mechanism and the electric motors in the panoramic camera of the present invention.

FIGS. 6 and 8 schematically illustrate the manner in which the electrical circuit is altered between a 28-volt direct current power source and the motor 64 by the coaction of the sliding element 72 and the actuators of the snap-acting switches 69 and 71. As shown, the position of the electrical switches in FIG. 8 will cause the motor 64 to effect a scanning event. Under this condition the motor 64 drives the lens box 23 in one direction (counterclockwise as shown in FIG. 1). This direction causes the roller 42 to rotate counterclockwise also. The clutch 44 will cause the drum 41 to be driven with the roller 42. The counterclockwise rotation of the roller 42 will cause clockwise rotation of the idlers 49 and 51 as permitted by the respective clutches 53 and 57. At nearly the extreme counterclockwise position of the lens box 23, the clockwise-end of the arcuate slot 74 engages the stud 73 and causes the sliding element 72 to engage the actuators of the switches 69 and 71 to thereby reverse the polarity of the power supply at the motor 64. The motor 64 thereby reverses and drives the lens box 23 and the roller 42 the other (clockwise) direction. The clutch 44 removes the driving connection with the roller 42 to the drum. Any tendency for the drum 41 to rotate clockwise will be resisted by the inability of the contacting idlers 49 and 51 to rotate counterclockwise. Hence, the film 13 and 13' interposed between the idlers 49 and 51 and the film drum 41 remains fixed in the film drive assembly and will be transported therewith. In this manner the film 13 and 13' is transferred from the supply magazine 12 to the receiver magazine 14. When the lens box 23 reaches the clockwise extreme of its travel as determined by the scanning angle, the slot 74 engages the stud 73 and causes the sliding element 72 to disengage the actuators of the switches 69 and 71 and restore the circuit to the condition shown in FIGS. 6 and 8. Subsequent scanning and transporting cycles are then repeated automatically until the electrical supply is disconnected.

During the film transport event it may be desirable to maintain a take-up tension on the exposed film 13' to avoid its entanglement within the camera. This can be accomplished by an electric take-up motor 76 of a stalled-rotor type which will apply a constant tension to the film 13' while the transport event takes place. The take-up motor 76 is electrically connected to the power source in parallel with one of the contacts of the switch 71. As will be observed in FIG. 8, when the sliding element 72 is in the disengaged position shown, the take-up motor 76 is shorted out of the power supply circuit. When the sliding element 72 engages the actuators of the switches 69 and 71, at the end of the scanning event, the parallel contact in switch 71 is opened. An electrical potential thus appears across the take-up motor 76.

In relation to the dimensions and weight of the objective lens system 22, the present invention makes it possible for the film drive assembly to be constructed of very lightweight materials. The heavy elements are concentrated substantially at the pivotal axis of the lense box 23. It should, therefore, be apparent that high rates of oscillation of the lense box 23 can be obtained without large inertial effects being present. The film supply and film take-up are stationary except to the extent that the reels rotate during the transporting event; hence, the inertial effects of the film during the scanning event are negligible. It should be also be now apparent that the manner in which the film 13 is supported about the film drum 41 at the area of exposure on the optical focal plane is flat throughout the width of the film 13 thereby assuring a high degree of acuity of the objective image. Synchronization between the film position and the optical axis is also maintained automatically by the positive connection of the film drive assembly movable components with the movable components of the objective lens system.

It will be understood, of course, that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. A panoramic camera for automatically transporting a metered quantity of photosensitive strip film and exposing the film to an objective image formed of a field of view to be scanned comprising: a camera housing including a film supply and a film receiver, an objective lens system pivotally connected at one end of said housing on an axis intersecting and normal to its optical axis for projecting an objective image into said housing, parallel arcuate guide rails fixed at the other end of said housing to opposite walls thereof in planes normal to said pivotal axis and with their center of curvature on said pivotal axis, a guide roller on the convex surface of each of said guide rails for rolling thereon, a smooth cylindrical film drum journaled at its ends between said guide rollers and with its circumference from end-to-end tangent to the focal plane circumscribed by said lens system for training any film passing over its periphery at the focal plane, said drum and said guide rollers having a common axis of rotation parallel to said pivotal axis and intersecting said optical axis, force-exerting means operatively connected between said lens system and said film drum for urging said guide rollers into pure rolling contact on the convex surfaces of said guide rails, clutch means operatively connected between said film drum and at least one of said guide rollers for positively driving said film drum only when said lens system is pivoted in a scanning direction, first and second cylindrical pad idlers having their end-to-end axes parallel to said film drum axis and rotatably supported by arm means pivotally connected to said lens system, said first idler being positioned on a side of the film drum axis opposite to said second idler, and both of said idlers being further positioned relative to the pivotal axis radially beyond the film drum axis, force-exerting means operatively connected between said lens system and said arm means thereby urging said pad idlers toward said film drum for obtaining a pure rolling contact of said idlers on any film interposed between either of said idlers and said film drum, and clutch means operatively connected between said pad idlers and said arm means for locking said pad idlers against rotation only when said lens system is pivoted in a film transporting direction; whereby, when the film in said film supply is normally threaded around the first idler, around the film drum, and around the second idler to the film receiver, and when said lens system is oscillated about said pivotal axis, the film is alternately transported and exposed.

2. A camera as set forth in claim 1 further comprising reversible drive means mounted on said housing and operatively connected to said objective lens system for selectively pivoting said lens system in said scanning and transporting directions, and means for automatically reversing said drive means at predetermined limits.

3. A camera as set forth in claim 2 wherein said reversible drive means comprises an electric motor in which the direction of rotation is responsive to the polarity of an applied voltage, and said reversing means includes electrical switch means actuated by a lost-motion connection between said lens system and the actuating lever of said switch means.

4. A camera as set forth in claim 1 further comprising masking means fixed to said objective lens system near the focal plane for limiting the instantaneous film exposure to a predetermined amount.

5. A panoramic camera for automatically transporting a metered quantity of photosensitive strip film and exposing the film to an objective image formed of a field of view to be scanned comprising: a camera housing including a film supply and a film receiver, an objective lens system pivotally connected at one end of said housing on an axis intersecting and normal to its optical axis for projecting an objective image into said housing, a smooth cylindrical film drum journaled at its ends between two coaxial guide rollers and circumferentially tangent to the focal plane circumscribed by said lens system for training any film passing over its periphery at the focal plane, said drum and said guide rollers having a common axis of rotation parallel to said pivotal axis and intersecting said optical axis, force-exerting means operatively connected between said lens system and said film drum for urging said guide rollers into pure rolling contact with said housing, clutch means operatively connected between said film drum and at least one of said guide rollers for positively driving said film drum only when said lens system is pivoted in a scanning direction, first and second cylindrical pad idlers having their end-to-end axes parallel to said film drum axis and rotatably supported by arm means pivotally connected to said lens system, said first idler being positioned on a side of the film drum axis opposite to said second idler, said idlers being further positioned relative to the pivotal axis radially beyond the film drum axis, force-exerting means operatively connected between said lens system and said arm means thereby urging said pad idlers toward said film drum for obtaining a pure rolling contact of said idlers on any film interposed between either of said idlers and said film drum, and clutch means operatively connected between one of said pad idlers and one of said arm means for locking said one pad idler against rotation only when said lens system is pivoted in a film transporting direction; whereby, when the film in said film supply is normally threaded around the first idler, around the film drum, and around the second idler to the film receiver, the film is alternately transported and exposed as said lens system oscillates about said pivotal axis.

6. A panoramic camera for automatically transporting a metered quantity of photosensitive strip film and exposing the film to an objective image formed of a field of view to be scanned comprising: a camera housing including a film supply and a film receiver, an objective lens system pivotally connected to said housing for projecting an objective image into said housing, a smooth cylindrical film drum journaled to said lens system training any film passing over its periphery at the focal plane, means for correlating the rotation of said drum with the pivoting of said lens system, clutch means operatively connected between said film drum and lens system for positively driving said film drum only when said lens system is pivoted in a scanning direction, a cylindrical pad idler having its end-to-end axis parallel to said film drum axis and rotatably supported by arm means pivotally connected to said lens system, said idler being positioned relative to the pivotal axis radially beyond the film drum axis, force-exerting means operatively connected between said lens system and said arm means thereby urging said pad idler toward said film drum for obtaining a pure rolling contact of said idler on any film interposed between said idler and said film drum, and clutch means operatively connected between said pad idler and said arm means for locking said pad idler against rotation only when said lens system is pivoted in a film transporting direction; whereby, when the film in said film supply is normally threaded around said idler and around the film drum to the receiver, the film is alternately transported and exposed as said lens system oscillates about the pivotal axis.

References Cited in the file of this patent

UNITED STATES PATENTS

| | | |
|---|---|---|
| 914,668 | Olsson | Mar. 9, 1909 |
| 2,129,959 | Pollock | Sept. 13, 1938 |
| 2,348,456 | Dickerman | May 9, 1944 |
| 2,764,073 | Liu | Sept. 25, 1956 |

FOREIGN PATENTS

| | | |
|---|---|---|
| 819,356 | Great Britain | Sept. 2, 1959 |